(12) United States Patent
Boden et al.

(10) Patent No.: US 9,141,379 B2
(45) Date of Patent: Sep. 22, 2015

(54) AUTOMATED CODE COVERAGE MEASUREMENT AND TRACKING PER USER STORY AND REQUIREMENT

(71) Applicant: International Business Machines Corporation, Armonk, NY (US)

(72) Inventors: Edward B. Boden, Highland, NY (US); Robert C. Hansen, Endicott, NY (US); Anthony F. Pioli, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 13/741,782

(22) Filed: Jan. 15, 2013

(65) Prior Publication Data

US 2014/0201703 A1    Jul. 17, 2014

(51) Int. Cl.
*G06Q 10/00*    (2012.01)
*G06F 9/44*    (2006.01)
*G06F 9/46*    (2006.01)
*G06F 11/36*    (2006.01)

(52) U.S. Cl.
CPC .............. *G06F 8/70* (2013.01); *G06F 11/3676* (2013.01)

(58) Field of Classification Search
CPC ............ G06F 11/3632; G06F 11/3636; G06F 11/3664; G06F 11/3672; G06F 11/3684; G06F 8/10; G06F 8/20; G06F 8/34; G06F 8/451; G06F 8/71; G06F 9/44; G06F 8/30; G06F 9/4881; G06F 9/5044; G06F 9/5055; G06Q 10/06; G06Q 10/063114; G06Q 10/06311
See application file for complete search history.

(56) References Cited

U.S. PATENT DOCUMENTS

| | | |
|---|---|---|
| 5,617,568 A | 4/1997 | Ault et al. |
| 6,342,907 B1 | 1/2002 | Petty et al. |
| 6,367,077 B1 | 4/2002 | Brodersen et al. |
| 6,536,036 B1 | 3/2003 | Pavela |
| 6,799,718 B2 | 10/2004 | Chan et al. |

(Continued)

FOREIGN PATENT DOCUMENTS

| | | |
|---|---|---|
| CA | 2680978 A1 | 4/2010 |
| CN | 101833507 B | 12/2011 |

(Continued)

OTHER PUBLICATIONS

Dean Leffingwell, A Rally Software Development Corporation Whitepaper—Agile Software Development with Verification and Validation in High Assurance and Regulated Environments, 2011, [Retrieved on Feb. 3, 2015]. Retrieved from the internet: <URL: http://www.ultertechnologies.com/docs/agile.pdf> 33 Pages (1-33).*

(Continued)

*Primary Examiner* — Don Wong
*Assistant Examiner* — Anibal Rivera
(74) *Attorney, Agent, or Firm* — Cantor Colburn LLP; William A. Kinnaman, Jr.

(57) ABSTRACT

Embodiments of the invention relate to automated code coverage measurement and tracking per user story and requirement. An aspect of the invention includes receiving one or more software development requirements. One or more tasks are generated from the one or more software development requirements. A task identifier (ID) is assigned to each of the one or more tasks, and each of the task IDs is assigned to at least one code component. An application is released that includes at least one code components.

6 Claims, 4 Drawing Sheets

(56) References Cited

U.S. PATENT DOCUMENTS

| | | |
|---|---|---|
| 6,910,041 B2 | 6/2005 | Exton et al. |
| 7,000,184 B2 | 2/2006 | Matveyenko et al. |
| 7,127,707 B1 | 10/2006 | Mishra et al. |
| 7,139,737 B2 | 11/2006 | Takahashi et al. |
| 7,149,699 B2 * | 12/2006 | Barnard et al. ............ 705/7.26 |
| 7,210,066 B2 | 4/2007 | Mandava et al. |
| 7,272,752 B2 | 9/2007 | Farchi et al. |
| 7,467,198 B2 | 12/2008 | Goodman et al. |
| 7,467,202 B2 | 12/2008 | Savchuk |
| 7,503,037 B2 | 3/2009 | Banerjee et al. |
| 7,509,626 B1 | 3/2009 | Barnes et al. |
| 7,512,957 B2 | 3/2009 | Cohen et al. |
| 7,530,057 B2 | 5/2009 | Babcock |
| 7,555,742 B2 | 6/2009 | Iborra et al. |
| 7,562,338 B2 | 7/2009 | Knutson et al. |
| 7,581,205 B1 | 8/2009 | Massoudi |
| 7,587,636 B2 | 9/2009 | Tillmann et al. |
| 7,752,606 B2 | 7/2010 | Savage |
| 7,761,591 B2 | 7/2010 | Graham |
| 7,778,899 B2 | 8/2010 | Scumniotales et al. |
| 7,861,178 B2 | 12/2010 | Lui et al. |
| 7,904,890 B1 | 3/2011 | Hsieh et al. |
| 7,979,796 B2 | 7/2011 | Williams et al. |
| 8,006,222 B2 | 8/2011 | Ruhe |
| 8,032,860 B2 | 10/2011 | Piehler et al. |
| 8,037,453 B1 | 10/2011 | Zawadzki |
| 8,069,435 B1 | 11/2011 | Lai |
| 8,104,018 B2 | 1/2012 | Chessell et al. |
| 8,112,814 B2 | 2/2012 | Shimizu |
| 8,347,263 B1 | 1/2013 | Offer |
| 8,407,669 B2 | 3/2013 | Yee et al. |
| 8,429,708 B1 | 4/2013 | Tandon |
| 8,458,646 B2 | 6/2013 | Knutson et al. |
| 8,566,779 B2 * | 10/2013 | Sukhenko et al. ............ 717/103 |
| 8,577,937 B1 | 11/2013 | Offer |
| 8,645,341 B2 | 2/2014 | Salman et al. |
| 8,645,907 B2 * | 2/2014 | Jain et al. ............ 717/101 |
| 8,701,078 B1 * | 4/2014 | Holler et al. ............ 717/101 |
| 8,707,248 B2 | 4/2014 | Sawant et al. |
| 8,875,088 B1 * | 10/2014 | Holler et al. ............ 717/101 |
| 2001/0013024 A1 | 8/2001 | Takahashi et al. |
| 2002/0016953 A1 | 2/2002 | Sollich |
| 2002/0111808 A1 | 8/2002 | Feinberg |
| 2002/0124072 A1 | 9/2002 | Tormasov et al. |
| 2002/0149614 A1 | 10/2002 | Biebesheimer et al. |
| 2002/0165912 A1 | 11/2002 | Wenocur et al. |
| 2002/0178360 A1 | 11/2002 | Wenocur et al. |
| 2002/0194483 A1 | 12/2002 | Wenocur et al. |
| 2002/0194501 A1 | 12/2002 | Wenocur et al. |
| 2002/0199001 A1 | 12/2002 | Wenocur et al. |
| 2002/0199096 A1 | 12/2002 | Wenocur et al. |
| 2003/0009694 A1 | 1/2003 | Wenocur et al. |
| 2003/0041110 A1 | 2/2003 | Wenocur et al. |
| 2003/0056173 A1 | 3/2003 | Copenhaver et al. |
| 2003/0093716 A1 | 5/2003 | Farchi et al. |
| 2003/0121011 A1 | 6/2003 | Carter |
| 2004/0025166 A1 | 2/2004 | Adlung et al. |
| 2004/0143811 A1 * | 7/2004 | Kaelicke et al. ............ 717/101 |
| 2004/0204970 A1 | 10/2004 | Boden et al. |
| 2005/0039045 A1 | 2/2005 | Wheeler |
| 2005/0044197 A1 | 2/2005 | Lai |
| 2005/0055399 A1 | 3/2005 | Savchuk |
| 2005/0114331 A1 | 5/2005 | Wang et al. |
| 2005/0114771 A1 | 5/2005 | Piehler et al. |
| 2005/0114830 A1 | 5/2005 | Knutson et al. |
| 2005/0144529 A1 | 6/2005 | Gotz et al. |
| 2005/0160405 A1 | 7/2005 | Lunia et al. |
| 2006/0036935 A1 | 2/2006 | Warner et al. |
| 2006/0150200 A1 | 7/2006 | Cohen et al. |
| 2006/0230410 A1 | 10/2006 | Kurganov et al. |
| 2006/0287959 A1 | 12/2006 | Blecken |
| 2007/0005300 A1 | 1/2007 | Haggerty et al. |
| 2007/0006160 A1 | 1/2007 | Kunz et al. |
| 2007/0156693 A1 | 7/2007 | Soin et al. |
| 2007/0168918 A1 * | 7/2007 | Metherall et al. ............ 717/101 |
| 2007/0250815 A1 | 10/2007 | Bendapudi et al. |
| 2008/0027742 A1 | 1/2008 | Maeda |
| 2008/0066071 A1 * | 3/2008 | Jain et al. ............ 717/123 |
| 2008/0102422 A1 | 5/2008 | Hayes et al. |
| 2008/0120602 A1 | 5/2008 | Comstock et al. |
| 2008/0148253 A1 | 6/2008 | Badwe et al. |
| 2008/0229278 A1 | 9/2008 | Liu et al. |
| 2008/0244557 A1 | 10/2008 | Yeung et al. |
| 2008/0263505 A1 * | 10/2008 | StClair et al. ............ 717/101 |
| 2008/0270981 A1 | 10/2008 | Hutchison et al. |
| 2009/0031286 A1 | 1/2009 | Yee et al. |
| 2009/0037912 A1 * | 2/2009 | Stoitsev et al. ............ 718/100 |
| 2009/0119779 A1 | 5/2009 | Dean et al. |
| 2009/0259985 A1 | 10/2009 | Knutson et al. |
| 2009/0271319 A1 | 10/2009 | Bromley et al. |
| 2009/0271760 A1 | 10/2009 | Ellinger |
| 2010/0169862 A1 | 7/2010 | Wolf et al. |
| 2010/0180258 A1 | 7/2010 | Takahashi |
| 2010/0228683 A1 | 9/2010 | Ansley et al. |
| 2010/0251379 A1 | 9/2010 | Myers et al. |
| 2010/0269095 A1 | 10/2010 | King et al. |
| 2010/0313179 A1 | 12/2010 | Groves et al. |
| 2011/0066420 A1 | 3/2011 | Bassin et al. |
| 2011/0088014 A1 | 4/2011 | Becker et al. |
| 2011/0131134 A1 | 6/2011 | Ferris et al. |
| 2011/0131315 A1 | 6/2011 | Ferris et al. |
| 2011/0138358 A1 | 6/2011 | Rau et al. |
| 2011/0154378 A1 | 6/2011 | Kishan et al. |
| 2011/0239227 A1 | 9/2011 | Schaefer et al. |
| 2011/0246540 A1 | 10/2011 | Salman et al. |
| 2011/0264649 A1 | 10/2011 | Hsiao et al. |
| 2011/0295701 A1 | 12/2011 | Phan |
| 2012/0005209 A1 | 1/2012 | Rinearson et al. |
| 2012/0005692 A1 | 1/2012 | Bulko et al. |
| 2012/0011455 A1 | 1/2012 | Subramanian et al. |
| 2012/0054250 A1 | 3/2012 | Williams et al. |
| 2012/0158527 A1 | 6/2012 | Cannelongo et al. |
| 2012/0158669 A1 | 6/2012 | Morsi et al. |
| 2012/0159441 A1 * | 6/2012 | Ghaisas ............ 717/123 |
| 2012/0174194 A1 | 7/2012 | Furukawa |
| 2012/0210243 A1 | 8/2012 | Uhma et al. |
| 2012/0246609 A1 | 9/2012 | Boden et al. |
| 2012/0246611 A1 | 9/2012 | Sawant et al. |
| 2012/0291010 A1 | 11/2012 | Hutchison et al. |
| 2012/0304248 A1 | 11/2012 | Watts et al. |
| 2012/0311003 A1 | 12/2012 | Kuznetsov et al. |
| 2013/0024847 A1 * | 1/2013 | Browne et al. ............ 717/131 |
| 2013/0061200 A1 | 3/2013 | Roberts et al. |
| 2013/0216205 A1 | 8/2013 | Suri et al. |
| 2013/0326637 A1 | 12/2013 | Fang et al. |
| 2014/0013440 A1 | 1/2014 | Thakur et al. |
| 2014/0053127 A1 * | 2/2014 | Madison et al. ............ 717/103 |
| 2014/0123107 A1 | 5/2014 | Rajagopalan |
| 2014/0201704 A1 | 7/2014 | Boden et al. |
| 2015/0020053 A1 | 1/2015 | Boden et al. |

FOREIGN PATENT DOCUMENTS

| | | |
|---|---|---|
| JP | 2006195529 A | 7/2006 |
| KR | 823227 B1 | 4/2008 |
| WO | 2011031328 A2 | 3/2011 |

OTHER PUBLICATIONS

International Search Report and Written Opinion: International Application No. PCT/IB2014/058076, International filing date: Jan. 6, 2014; Date of mailing Apr. 21, 2014.

Achim D. Brucker et al., "HOL-TestGen an Interactive Test-case Generation Framework,"; M. Chechik and M. Wirsing (Eds.): FASE 2009, LNCS 5503, pp. 417-420, 2009.

L. Chung et al., "On Non-Functional Requirements in Software Engineering," Lecture Notes in Computer Science, v.5600, pp. 363-379, 2009.

IBM, "Method and System for Dynamically Unloading and Loading Software Applications from a Peer-to-Peer Platform", IP.com IPCOM000193302D, Feb. 18, 2010, pp. 1-3.

(56) References Cited

OTHER PUBLICATIONS

Anonymous, "Standardization for the Configuration of Heterogeneous Platforms Through Schema-Based Platform Tag Definitions", IP.com IPCOM000020720D, Dec. 10, 2003, pp. 1-5.

Huaikou Miao et al., "An Approach to Generating Test Cases for Testing Component-based Web Applications,"; Workshop on Intelligent Information Technology Application, Dec. 2-3, 2007, p. 264-269.

Yara, P, et al. "Global Software Development with Cloud Platforms", Gotel, O. et al. (eds): SEAFOOD 2009, LNBIP 35, pp. 81-95, 2009.

Wei Yu, "Refactoring Use Case Models on Episodes," Thesis, Dept. of Computer Science, Concordia Univ., Montreal, Quebec, Mar. 2004.

European Examination Report for Application No. EP10776347.6-1957, dated Oct. 3, 2014, 6 pgs.

* cited by examiner

AUTOMATED CODE COVERAGE MEASUREMENT AND TRACKING PER USER STORY AND REQUIREMENT

BACKGROUND

This invention relates generally to processing within a computing environment, and more particularly to automated code coverage measurement and tracking per user story and requirement.

The discipline of software testing has long dealt with testing quality questions such as completeness, efficiency, and effectiveness. One of the concepts through which these questions are addressed is the notion of test coverage. Test coverage is a measure of what percentage of something has been tested, where the most common basis for test coverage measurement is the amount of the source code that has been tested. Code coverage measures what percentage of the total source code base has been executed during testing (completeness). Most programming languages have automated tools to measure code coverage. Code coverage determines the efficiency of testing by, for example, enabling the ratio of test costs per test coverage level to be tracked and managed across time. Test coverage additionally enables the comparison of test coverage and defect rates for past releases for given areas of the code base.

The limitations of code coverage are addressed by using alternatives that relate to the "important" code paths as determined by users. These important code paths may include functions, user scenarios, interfaces, commands, use cases, graphical user interface (GUI) panels, etc. Coverage measurement using these as a basis is common, often in parallel with code coverage.

BRIEF SUMMARY

Embodiments include a method, system, and computer program product for automated code coverage measurement and tracking per user story and requirement. One or more software development requirements are received. One or more tasks are generated from the one or more software development requirements. A task identifier (ID) is assigned to each of the one or more tasks, and each of the task IDs is assigned to at least one code component. An application is released that includes at least one code component.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
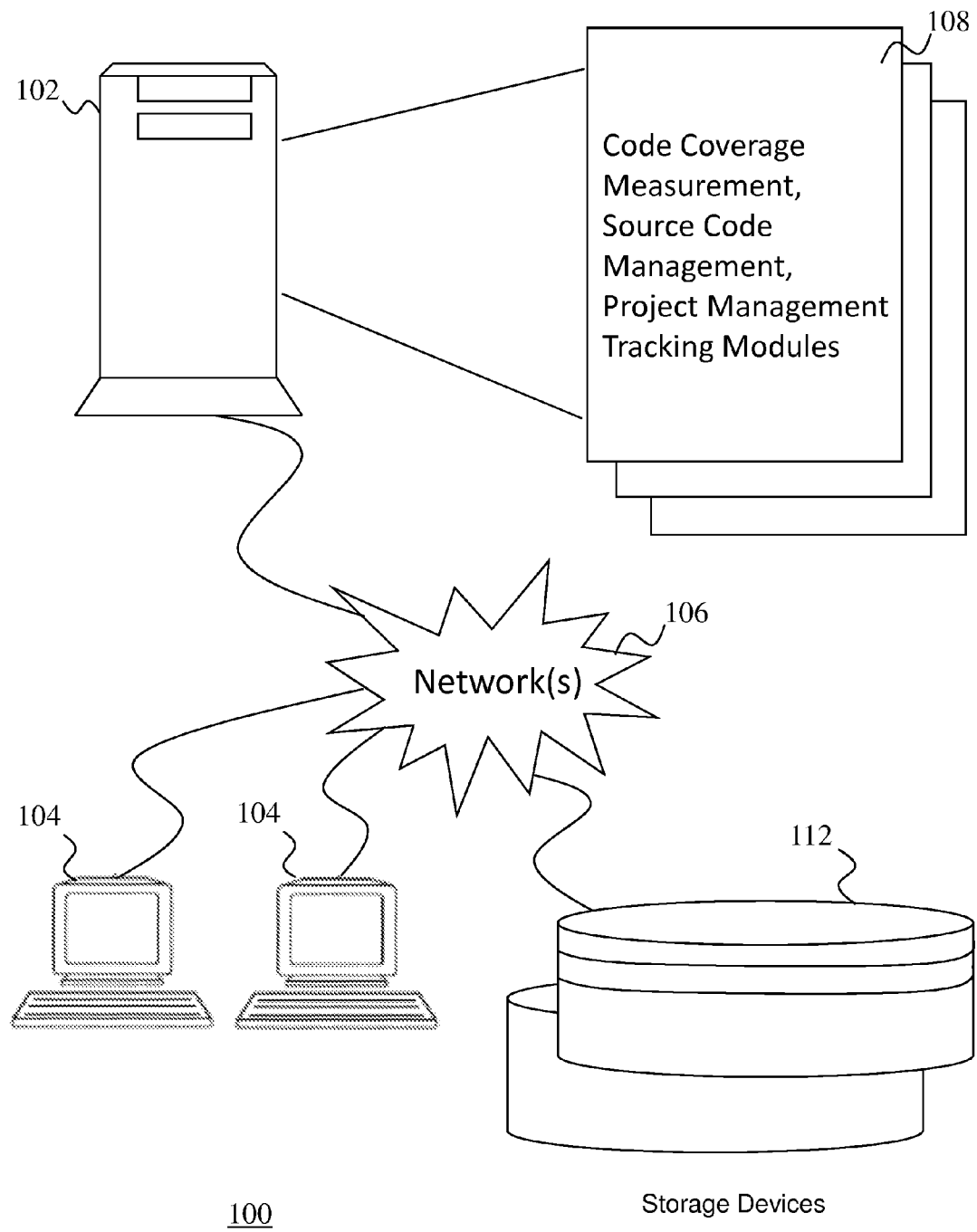
FIG. 1 depicts a schematic diagram of a system for automated code coverage measurement and tracking per user story and requirement that may be implemented by an embodiment.

An embodiment of the present invention provides for automated code coverage measurement and tracking per user story and requirement.

In an embodiment, automated code coverage measurement and tracking per user story and requirement is provided by deriving the association between specific source code changes to their respective requirements. Tests are executed against a complied version of the software, and the lines of code that were executed by the test are mapped to requirements associated with the lines of code. Code coverage is then determined for one or more requirements.

This invention improves the business value and test efficiency by automating the ability to relate code coverage to original product or release requirements. Requirements vary in relative costs, priority and business importance. By automatically producing code coverage mapping to requirements, many key test planning and defect response decisions are linked to requirement attributes such as priority and business importance.

Existing methods of aligning test results through requirements by testing functional or even use case systems are incomplete and problematic, and typically have overhead. One problem is that test automation is needed per unit of function or per user scenario, per command, per panel, etc., and therefore must be specifically developed that way, which creates an additional burden on testing resources. This is even before coverage measurement for these externals is available. Furthermore, unit test automation is unaccounted for with respect to these coverage measures. Another common difficulty is quantifying functions or user scenarios cleanly and completely, without overlap, so that testing can be efficiently implemented.

By applying the mapping of code coverage testing and code coverage tools (e.g., Emma, Clover, NCover, etc.), to the automation associated with a source code management tools (e.g., SVN commit logs, etc.), and development work tracking tool (e.g., Rational Team Concert), with content-space derived user stories (parts which invention exploits), any issues may be timely identified, and therefore effectively addressed. It will be understood, however, that even without dedicated testing tools or environments as stated above, the code coverage mapping described herein may still be effective in custom developed and managed testing environments.

Automated code coverage tools are used to generate code coverage results. In an embodiment, code coverage per requirement is calculated automatically based on the results of tests executed against the code which has been developed to fulfill the requirements. The code coverage results are automatically mapped to requirements. The mapping is based on source code management system commits, which are mapped to development tasks, which are mapped to user stories, which are mapped to requirements. The requirements may be represented as the original top level system development input, and are typically received from product stakeholders or as a higher resolution partitioning of requirements into user stories. Because code coverage results are automated, the tested code is counted and related to the requirements, and the late-cycle feedback on test completeness is greatly improved. In addition, if the generated user stories are used to partition requirements, the integrity and reproducibility of problems within "functions" and user scenarios may be addressed.

Metrics like code coverage per requirement (e.g., per Epic) or code coverage per user story is automatically computed, compared, tracked and used to improve test quality and help assure product quality. Test effectiveness and efficiency is also improved. Also automated results may be output by splits such as: code coverage per user story, code coverage per component, code coverage per development team, code coverage per platform, code coverage per external interface, etc.

Turning now to FIG. 1, a system 100 for implementing automated code coverage measurement and tracking per user story and requirement will now be described. In an embodiment, the system 100 includes a host system computer 102 executing computer instructions for implementing automated code coverage measurement and tracking per user story and requirement. Host system computer 102 may operate in any type of environment that is capable of executing a software application. Host system computer 102 may comprise a high-speed computer processing device, such as a mainframe computer, to manage the volume of operations governed by an entity for which the automated code coverage measurement and tracking per user story and requirement system is executing. In an embodiment, the host system computer 102 is part of an enterprise (e.g., a commercial business) that implements the automated code coverage measurement and tracking per user story and requirement.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the automated code coverage measurement and tracking per user story and requirement system described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 executing a user interface application (e.g., a web browser) to contact the host system computer 102 through the networks 106. In another embodiment, the client system 104 is connected directly (i.e., not through the networks 106) to the host system computer 102 and the host system computer 102 contains memory for storing data in support of automated code coverage measurement and tracking per user story and requirement. Alternatively, a separate storage device (e.g., one or more storage devices 112) may be implemented for this purpose.

In an embodiment, the one or more storage devices 112 includes a data repository with data relating to automated code coverage measurement and tracking per user story and requirement by the system 100, as well as other data/information desired by the entity representing the host system computer 102 of FIG. 1. The one or more storage devices 112 is logically addressable as a consolidated data source across a distributed environment that includes networks 106. Information stored in the one or more storage devices 112 may be retrieved and manipulated via the host system computer 102 and/or the client systems 104. In an embodiment, the one or more storage devices 112 includes one or more databases containing, e.g., automated code coverage measurement and tracking per user story and requirement system data and corresponding configuration parameters, values, methods, and properties, as well as other related information as will be discussed more fully below. It will be understood by those of ordinary skill in the art that the one or more storage devices 112 may also comprise other structures, such as an XML file on the file system or distributed over a network (e.g., one of networks 106), or from a data stream from another server located on a network 106. In addition, all or a portion of the one or more storage devices 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the automated code coverage measurement and tracking per user story and requirement. The host system computer 102 includes one or more content coverage measurement, source code management, and project management tracking modules 108. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions. In an embodiment, the automated code coverage measurement and tracking per user story and requirement system executes on the same host computer system that executes the application that is being tested. In other embodiments, the automated code coverage measurement and tracking per user story and requirement system is executed on a separate computer system from the application that is being tested.

It will be understood that the automated code coverage measurement and tracking per user story and requirement system described in FIG. 1 may be implemented in hardware, software executing on a general purpose computer, or a combination thereof.

Figure 2:
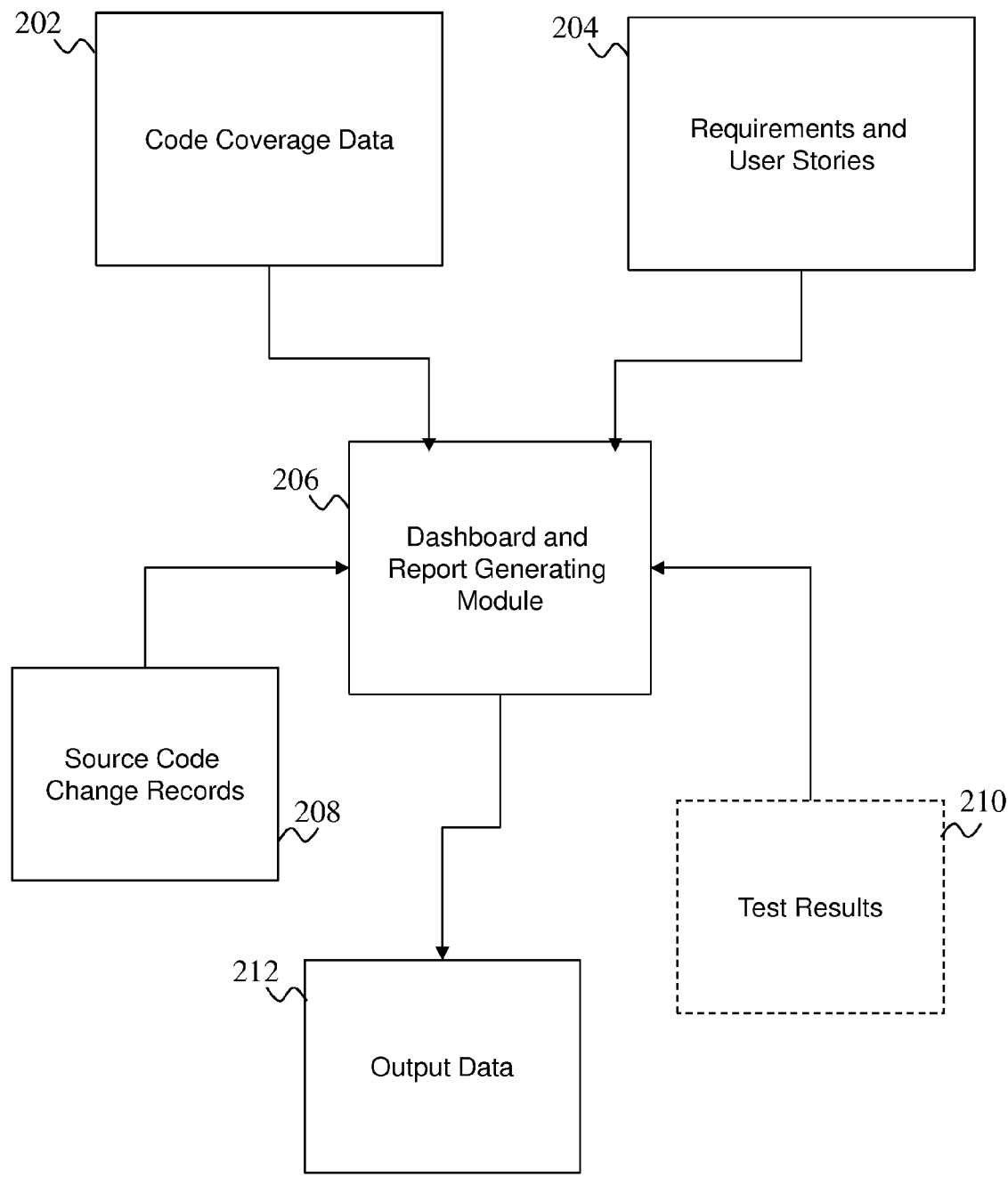
FIG. 2 depicts a schematic diagram of a code coverage mapping to requirements module in an embodiment.

FIG. 2 depicts a schematic diagram of a code coverage measuring and tracking module mapping to requirements, in an embodiment. In an embodiment, the dashboard and report generating module 206 executes on the host system computer 102 of FIG. 1. The dashboard and report generating module 206 receives data and generates an output. In an embodiment, the dashboard and report generating module 206 receives a set of code coverage data 202. The code coverage data 202 is generated in response to executing one or more test runs of the code. The code coverage data 202 includes each of the source code file name and line numbers within the source code for the specific pieces of the application that were executed by the one or more tests. In an embodiment, the code coverage data 202 also includes the number of times the line of source code was executed as a result of the one or more tests.

The dashboard and report generating module 206 additionally receives data representing a set or subset of business requirements and or user stories 204 for an application. In an embodiment, the data representing the application is a set of user stories 204. The user stories 204 are based on a set of user requirements and prior release content that are implemented in the software or application under test. Any changed or new user stories 204 in the release each have an indication of the one or more requirements that caused the user story to be changed or added to the release.

In an embodiment, the set of requirements is partitioned into one or more user stories 204. The full set of user stories 204 represents the entirety of the business requirements with no gaps. In addition, no two user stories 204 will overlap (i.e., represent the same business requirement) and some user stories 204 are impacted by multiple requirements. The user stories 204 are generated from the business requirements and prior release content. In an embodiment, the user stories 204 are automatically generated from the business requirements, using an automated system, and are stored in, for example, a file or a database. In an alternate embodiment, the user stories 204 are created by uses of the system. In an additional embodiment, a portion of the user stories 204 are created manually while another portion is created automatically. In an embodiment, the user stories are stored in a database typically used for project management. The user stories 204 that are planned for a given release are then passed to the dashboard and report generating module 206. In an embodiment, a subset of the total user stories 204 may be used to compute code coverage per requirement. The user stories 204 may be supplied in a single file or in multiple files.

In an embodiment, the requirements, or user stories 204, are divided into tasks for purposes of development. Software developers are assigned one or more tasks, and develop or modify software in order implement the functionality described in the associated task.

In an embodiment, the code coverage data 202 is generated as a result of executing one or more test cases. Test cases are user defined as automated or manual tests. Each of the test cases is executed to test a particular aspect of the application to ensure that the application is functioning as specified in the business requirements. In an embodiment, the test cases are grouped into test suites, and are executed to test one or more functions of an application. In an embodiment, when the tests are executed, either manually or using an automated testing system, the test results 210 (i.e., passed, failed, etc.) are collected and recorded. The test results 210 are correlated back to the test cases so that the reports will indicate which tests succeeded and which failed. The test results 210 may be supplied in a single file or in multiple files. In an embodiment, the test results 210 include an indicator to identify if the test was executed manually or if the test was executed automatically.

In an embodiment, when the code is completed and committed to the source code management system, source code change records 208 are generated and associated with the task that has been assigned to a developer. The dashboard and report generating module 206 additionally receives these change records 208 which are used in conjunction with the other inputs to produce various outputs 212 such as reports and Web Browser status dashboards.

Figure 3:
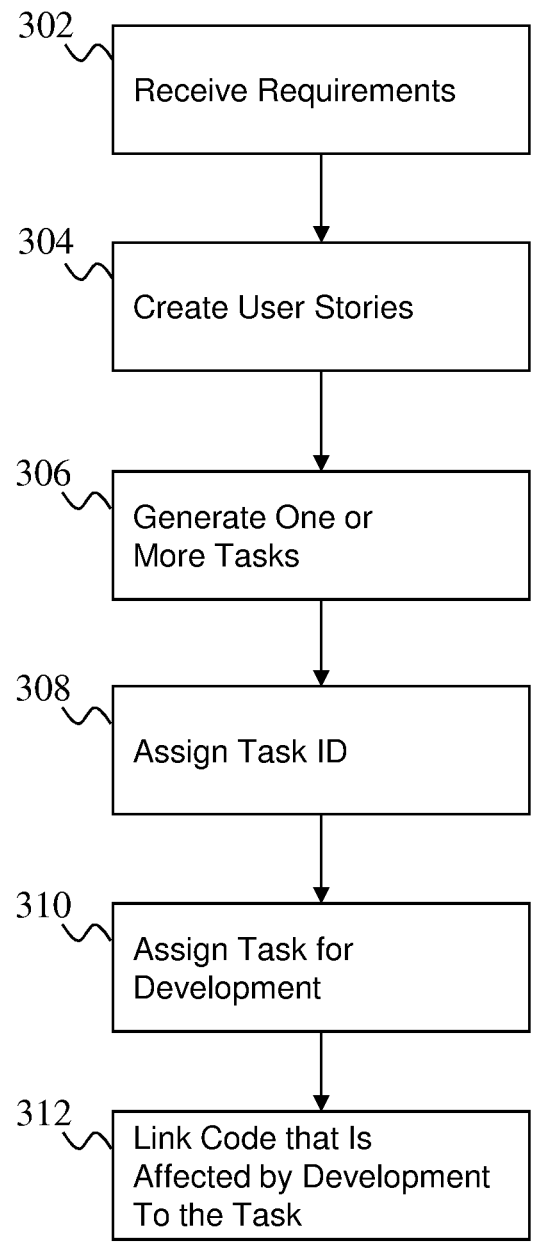
FIG. 3 depicts a process flow for associating requirements with code changes made for those requirements in an embodiment.

FIG. 3 depicts a process flow for associating requirements to code changes in an embodiment. In an embodiment, the process flow of FIG. 3 is executed by the one or more code coverage measurement, source code management, and project management tracking modules 108 of FIG. 1. At block 302, a set of one or more requirements is received. In an embodiment, the requirements are text based business requirements for development of one or more features in a software application. In additional embodiments, the requirements are use cases, other methods for managing the development of software applications (i.e. Unified Modeling Language (UML) documents, software based requirements management systems, etc.), or a combination of methods. At block 304, user stories are created from the one or more user requirements. The user stories may be generated automatically, or manually. The user stories are based on a product content space, which ensures that the result set of user stories partitions the product content and the requirements. The relationships between the user stories, requirements and tasks are maintained using identifiers. At block 306, one or more tasks are generated for each of the user stories by developers or other project personnel. In an embodiment, the tasks are generated in segments that allow for one or more software developers to quickly complete one or more logical components of a user story. In an embodiment, tasks are broken down into small pieces so that they are easier to understand, take a small amount of time to complete and hence are easier to schedule. For example, a task completion may be identified as a unit of work that takes 1 to 8 hours.

At block 308, each of the tasks is assigned a task identifier (ID). The task ID may be a number sequence, a letter and/or symbol sequence, a combination of letters, numbers, and symbols, or any other mechanism for assigning IDs as is known in the art.

In an embodiment, the task ID is generated and assigned to a task by a project management system or other means. At block 310, the task is assigned to one or more software developers for coding. At block 312, code that was created or modified by the software developers in support of their assigned task is linked to the task using the task ID and, by extension, to the requirement that the task is associated with. In an embodiment, the code is submitted to a source code repository along with the task ID. In an embodiment, the source code repository assigns a revision number and logs the entire revision. The revision log entry includes the details about what source code was changed and what the task ID was for the submit action, hence linking the source code changes to the task ID. In an additional embodiment, the task ID is associated with the changed code using one or more database tables, or any other method as is known in the art. It will be understood that the process flow of FIG. 3 is provided for purposes of clarity. In embodiments, one or more of the blocks of FIG. 3 may be omitted, or additional processing may occur between each block as would be understood by those of ordinary skill in the art.

Figure 4:
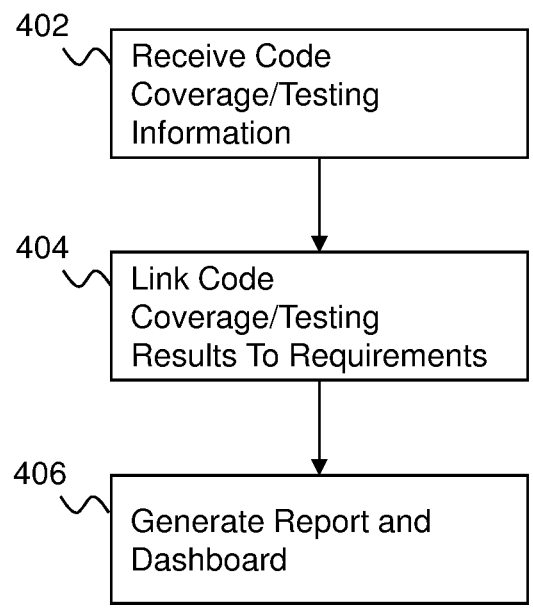
FIG. 4 depicts a process flow for matching code coverage and/or test results to modified code per requirement, in an embodiment.

FIG. 4 depicts a process flow for matching code coverage and/or test results to modified code in an embodiment. In an embodiment, the process flow of FIG. 4 is executed by one or more of the code coverage measurement, source code management, and project management tracking modules 108 of FIG. 1. At block 402, one or more results of a code coverage tool, and/or a code testing tool are received. In an embodiment, the code coverage results are generated during a test run and indicate which parts of the code have been executed by the test run. The test run may additionally provide a set of test results that indicate the success, or failure, of the test against various functions of the application. The code specified in the code coverage results is compared against the source code repository revision log to find matches. When code that has been executed is matched in the revision log, the associated task ID in the revisions entry is found.

At block 404, the code coverage and/or test results are linked to the requirements. In an embodiment, the code coverage and/or test results are linked to the requirements using the task ID found in 402. The task ID is associated with one or more pieces of code identified by file name and the lines in the file that have changed. Any piece of code that is executed in a test run is identified during that test run via code coverage results, and these tested code sections may be mapped to the task ID via code associated with the task ID. The task IDs are then mapped to the IDs of the user stories (by for example via intermediate task IDs), which are further associated in the project management database with the user stories, and from the user stories with the requirements. Therefore, for a given requirement all the committed code may be identified using user story IDs and Task IDs. A code coverage tool has associated code that creates a mapping of the overlaps between the two indexes of code that connects test to requirements.

At block 406, a report and/or interactive browser dashboard is generated which identifies all tasks that have been executed during the test run. In an embodiment, the report further includes results indicating if any of the tasks failed during their execution. In one embodiment, the dashboard shows all the requirements for the product release with a summary for each requirement. The per requirement summary has the amount of code submitted, the amount tested, and the further breakdown of the amount tested successfully and unsuccessfully. For the test failures, the defects are linked In an embodiment, the dashboard is updated as builds occur and as test automation is run. It will be understood that the process flow of FIG. 4 is provided for purposes of clarity. In embodiments, one or more of the blocks of FIG. 4 may be omitted, or additional processing may occur between each block as would be understood by those of ordinary skill in the art.

Technical effects and benefits include linking requirements directly to code changes made in support of the requirements. An additional benefit is linking the code changes and the requirements to the results of code coverage and code testing results. A further benefit is the ability to revert requirements related code to its original state based on the results of code coverage and/or test results.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system having a processor, comprising:
a code coverage module circuit, the code coverage module circuit configured to perform a method comprising:
receiving one or more software development requirements and partitioning the one or more software development requirements into one or more user stories;
generating one or more tasks from the one or more user stories;
assigning a task identifier (ID) to each of the one or more tasks and mapping each task identifier to one of the one or more user stories from which the task was generated;
associating at least one code component with each of the task IDs, the at least one code component comprising software code corresponding to the one or more software development requirements;
executing at least one test run, the at least one test run performed by at least one of a code coverage tool and a code testing tool against the at least one code component;
producing at least one test result, the at least one test result comprising the test results of the at least one code component executed by the at least one test run;
associating the at least one test result with the one or more software development requirements, wherein the at least one test result is associated with the at least one software development requirement by using the task ID of the at least one code component executed by the at least one test run; and
generating a report that identifies all tasks that have been executed during the at least one test run and includes an indication if any of the tasks failed during their execution, the report further including an amount of code executed during the at least one test run and a breakdown of the amount of code tested successfully and unsuccessfully.

2. The system of claim 1, wherein the one or more software development requirements are created from one or more business requirements.

3. The system of claim 1, wherein at least one of the one or more tasks is assigned to a software developer.

4. The system of claim 1, wherein the at least one code component is associated with the task ID using a source code repository.

5. The system of claim 1, wherein code coverage per requirement is calculated automatically based on the at least one test result.

6. The system of claim 2, wherein none of the one or more user stories represent a same one or more business requirements.

* * * * *